UNITED STATES PATENT OFFICE.

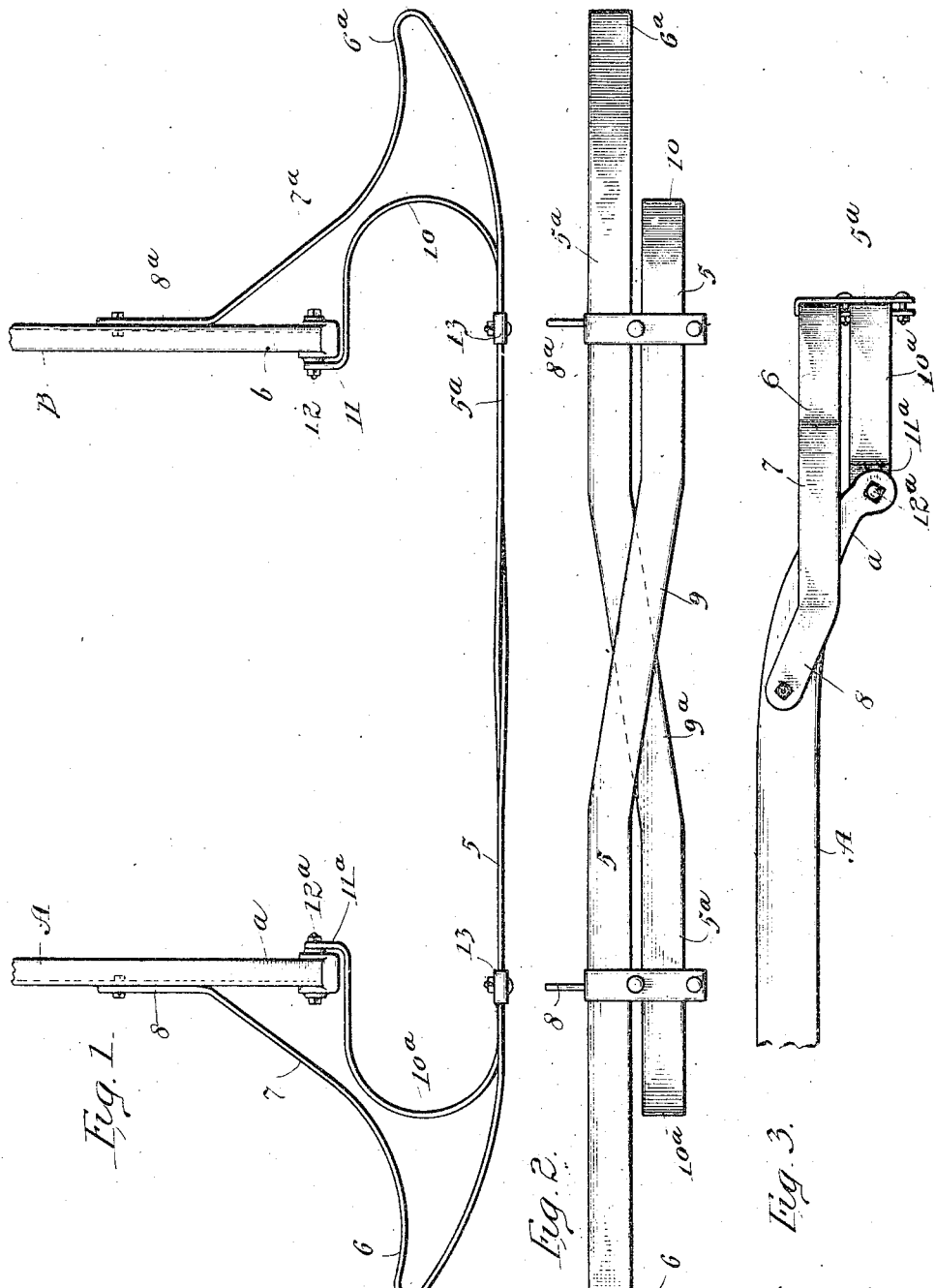

LEWIS F. STAFFORD, OF CHICAGO, ILLINOIS.

AUTOMOBILE BUMPER.

1,414,382. Specification of Letters Patent. Patented May 2, 1922.

Application filed May 26, 1921. Serial No. 472,877.

*To all whom it may concern:*

Be it known that I, LEWIS F. STAFFORD, a citizen of the United States, residing at Chicago, in the county of Cook and State of Illinois, have invented a new and useful Improvement in Automobile Bumpers, of which the following is a specification.

My invention relates to bumpers or guards for automobiles for protecting the vehicle from injury in collisions and minor accidents.

In the manufacture of bumpers for automobiles it has sometimes been the practice to provide a structure wherein a portion of the impact member is considerably wider than the remaining portions of the structure so as to produce a large area of striking surface at this location. This has usually been accomplished by doubling or adding an additional strip of the strap metal which forms the impact element of the bumper, which, of course, adds considerable weight to the central unsupported portion of the impact member and consequently subjects the attaching elements to greater strain and stress. I have provided a bumper structure wherein the advantages of the wide impact element are obtained, and have constructed the device so that the strain is distributed to each side of the vehicle. Further, I have provided a bumper structure wherein the impact portion is made of two parts or sections, and each part or section has a long attaching arm at one end and a shorter attaching arm at the opposite end so that when mounted upon their respective portions of the vehicle, the shorter arm of one section will assist the longer arm of the other section in the support of the impact-receiving element, thus providing a rigidly supported bumper structure that is less liable to become loosened on the vehicle by shocks and vibration received upon rough roadways, or from fast driving.

Further objects and advantages will be obvious after an understanding of my invention is had by reference to the following specification and accompanying drawings that form a part hereof:

In the drawings:

Figure 1 is a top plan of my improved vehicle bumper showing the structure secured to the side-sills of an automobile chassis.

Figure 2 is a front view thereof.

Figure 3 is a left-hand side view of the structure illustrated in Figure 1.

Similar reference characters are employed to designate the same parts throughout the several views of the drawings, and by referring to Figures 1 and 2 thereof, it will be seen I have identified the usual parallel side-sills of the chassis by letters A and B, which side-sills are curved downwardly towards their ends to form "horns" $a$ and $b$, respectively, for convenient attachment to the springs (not shown).

My improved bumper structure preferably comprises two substantially correspondingly shaped sections each having rearwardly extended elements for securing the structure to the vehicle whereby the rearwardly extended elements of one section may be secured to the side-sill proper at one side and the end of the horn of the other side-sill at the opposite side, and vice versa.

The bumper is fabricated of lengths of spring strap-metal and comprises substantially straight impact-receiving members 5 and 5$^a$ that extend transversely across the front of the vehicle, and for the purpose of convenience, I will proceed first with the description of the section having the impact-receiving member 5. As seen in Figure 1, the left-hand portion of impact member 5 is bent to form a guard or protector 6 in front of the vehicle wheel and fender (not shown) and then extends inwardly and rearwardly, as at 7, to the side-sill A of the chassis where it is given a pronounced bend so as to provide an arm 8 that extends along the side of and substantially parallel with the side-sill. As seen in Figure 3 of the drawings, the strap or leaf is given what is known as an "edge-bend" in an upward direction to somewhat conform to the inclination of horn $a$ of the sill. Intermediate its ends impact-receiving member 5 is given an edge-bend downwardly and then back to horizontal so as to position the portion of the member opposite guard 6 in a plane below that of the main portion of the opposite impact member 5$^a$ so that the two stretches of impact member 5 are connected by an oblique or inclined portion 9, as seen in Figure 2 of the drawings. After forming this lower reach of the impact member the metal strap is formed into a substantially semi-circular curve 10 that provides a spring or yielding element for connection with the vehicle which I prefer to accomplish by bending the metal laterally rearwardly to provide a short bracket-like element 11 adjacent the lower outer end of horn *b* of the opposite side-sill B of the chassis to which said structure is secured by the bolt 12 which is employed to attach the springs to the chassis horn *b*.

The impact-receiving member 5ª has its right-hand portion provided with guard 6ª with a rearwardly and inwardly extending stretch 7ª terminating in the arm 8ª that has an edge-bent to position it alongside the adjacent portion of sill B. The opposite portion of impact-receiving member 5ª has a semi-circular curved portion 10ª and the lateral bracket-like element 11ª for securing it to the outer end of the horn *a* by the bolt 12ª that secures the springs to the chassis, all as seen in the drawings, said parts corresponding substantially with the corresponding portions of the other section of the bumper. The intermediate portion 9ª of the impact-receiving element 5ª is given two edge bends which cross or pass oblique portion 9 of the other bumper element, as seen in Figure 2 of the drawings, so that the portions of the impact-receiving element upon the opposite sides of the inclined portion will be disposed one above the other below the plane of the adjacent portions of the other impact-receiving element.

Adjacent the commencement of the bends or curves 10 and 10ª the upper and lower leaves of the two impact-receiving elements are connected by clips 13 so as to rigidly relate the respective parts and to bring them into substantially vertical alinement with each other (see Fig. 3) which also presses the opposing faces of the oblique portions 9 and 9ª firmly together and prevents their rattling when driving over rough or uneven roadways.

What I claim as new is:

1. A vehicle bumper comprising two impact-receiving members the opposite ends of said members being extended rearwardly and inwardly to a vehicle, and the intermediate portions of said members crossing each other whereby the relative positions of the portions upon opposite sides of the crossing area is reversed, and means for securing the ends of said members to a vehicle.

2. A vehicle bumper comprising an impact-receiving member one end portion whereof is shaped to provide an outwardly extended guard and then extended rearwardly to provide an arm for attachment to a vehicle, and the opposite end of said member being curved to provide a spring element and attached to a vehicle; and a second impact-receiving member constructed similar to the first-mentioned member with its guard and spring element disposed respectively adjacent the spring element and guard of the first-mentioned member.

3. A vehicle bumper comprising a pair of impact-receiving members of similar construction, each member comprising a substantially straight portion having an edge-bend intermediate its ends to position the respective ends in different horizontal planes, one end portion terminating in a guard with a rearwardly extended arm for attachment to a vehicle and the opposite end terminating in a spring element for attachment to a vehicle, whereby the spring elements of the two impact members are positioned in the same horizontal plane, but in a plane spaced from the plane of said guards.

4. A vehicle bumper comprising two impact-receiving members having their front end portions arranged in vertical alinement with each other in different horizontal planes, the intermediate front portions of said members being obliquely disposed whereby said members cross each other at the center of the bumper structure to vertically reverse the relative positions of the respective portions of said members, and rearwardly extending portions at the opposite ends of the front portions of each member for attachment to a vehicle.

5. In combination with a chassis frame the side-sills whereof are extended downwardly to provide horns, of a bumper structure consisting of a pair of similar members each attached at one end to a side-sill and extending beyond said chassis and laterally therefrom and then bent transversely of the chassis, each bumper member at substantially the central portion of said bumper structure given an oblique direction and continued and then curved to form a connection with the horn of the opposite sill of the chassis whereby the oblique portions of each bumper member intersect.

6. A bumper comprising two similar bands of spring metal arranged to diagonally cross each other and each extended upon one end to provide a short curved arm for attachment to a vehicle and extended upon the other end to form a wheel and fender guard and for attachment to a vehicle at a point in a different transverse plane of the vehicle from the point of attachment of the opposite end.

7. A bumper comprising two similar bands of metal disposed above each other and arranged to diagonally cross each other at the center of the end of a vehicle whereby the relative positions of said bands are reversed, the lower portions of each band extended at their ends into curved arms for attachment to the vehicle and the upper portions of each band extended to their ends to form wheel and fender guards and having arms for attachment to the vehicle.

8. The combination with a vehicle chassis the side-sills whereof are extended longitudinally and downwardly to provide horns, of a bumper comprising two similar bands of metal disposed above each other and arranged to diagonally cross each other at the center of the end of the chassis whereby the relative positions of said bands are reversed upon each side of the diagonal portions, the lower portions of said bands extended at their ends for attachment to the chassis horns, and the upper portions of said bands extended at their ends for attachment to the side-sills of the chassis.

Signed at Chicago, county of Cook and State of Illinois, this 29th day of April, 1921.

LEWIS F. STAFFORD.